United States Patent
Skarin et al.

(10) Patent No.: US 9,123,022 B2
(45) Date of Patent: Sep. 1, 2015

(54) SYSTEMS AND METHODS FOR ANALYZING ENTITY PROFILES

(75) Inventors: Bruce Skarin, Millbury, MA (US); Andrew Duchon, Somerville, MA (US); Paul Allopenna, Storrs, CT (US); Rich Dejordy, West Roxbury, MA (US)

(73) Assignee: Aptima, Inc., Woburn, MA (US)

( * ) Notice: Subject to any disclaimer, the term of this patent is extended or adjusted under 35 U.S.C. 154(b) by 595 days.

(21) Appl. No.: 12/993,907

(22) PCT Filed: May 27, 2009

(86) PCT No.: PCT/US2009/045351
§ 371 (c)(1),
(2), (4) Date: Nov. 22, 2010

(87) PCT Pub. No.: WO2010/008685
PCT Pub. Date: Jan. 21, 2010

(65) Prior Publication Data
US 2011/0072052 A1    Mar. 24, 2011

Related U.S. Application Data

(60) Provisional application No. 61/056,625, filed on May 28, 2008.

(51) Int. Cl.
*G06F 17/30* (2006.01)
*G06Q 10/10* (2012.01)

(52) U.S. Cl.
CPC ........................... *G06Q 10/10* (2013.01)

(58) Field of Classification Search
CPC ............ G06F 17/30867; G06Q 30/02
USPC ......... 707/708, 737, 738, 739, 749, 751, 754, 707/755, 758, 767, 768, 771, 780, 784, 794, 707/E17.059, E17.06, 941, 999.008, 732, 707/734; 705/1.1, 7.11, 7.29, 7.32, 7.33, 705/7.34, 14.25, 14.27, 14.28, 14.44, 14.53, 705/14.57, 14.58, 14.61, 14.66, 14.67, 319, 705/341, 14.5, 8
See application file for complete search history.

(56) References Cited

U.S. PATENT DOCUMENTS

| | | |
|---|---|---|
| 6,757,719 B1 | 6/2004 | Lightman et al. |
| 6,802,042 B2 | 10/2004 | Rangan et al. |
| 6,947,947 B2 | 9/2005 | Block et al. |

(Continued)

FOREIGN PATENT DOCUMENTS

WO    WO2005098610    10/2005

*Primary Examiner* — Greta Robinson
(74) *Attorney, Agent, or Firm* — John J. Brooks III

(57) ABSTRACT

Embodiments of the subject invention comprise a computer based system and methods to collect and compare the attributes of a group of entities using data representing topic data of the entity and interaction data between entities. Embodiments of the invention comprise using minimally invasive means to automatically collect and model both an entity's attributes such as their knowledge/work/interest as well as model the social interactions of the entity together with a means to identify opportunities to influence changes in the entity attributes. Minimally invasive means to collect and model attributes include semantic analysis and topic modeling techniques. Means to model social interactions include social network analysis techniques that can incorporate location data of the entity. Embodiments of the invention further provide a sharable index of the attributes of the entities and the group of entities.

20 Claims, 12 Drawing Sheets

(56) References Cited

U.S. PATENT DOCUMENTS

| | | |
|---|---|---|
| 7,069,308 B2 | 6/2006 | Abrams |
| 7,117,192 B2 | 10/2006 | Waltz et al. |
| 7,162,691 B1 | 1/2007 | Chatterjee et al. |
| 7,178,096 B2 | 2/2007 | Rangan et al. |
| 7,184,959 B2 | 2/2007 | Gibbon et al. |
| 7,366,759 B2 | 4/2008 | Trevithick et al. |
| 7,379,880 B1 * | 5/2008 | Pathria et al. ............ 705/1.1 |
| 7,516,229 B2 * | 4/2009 | Trastour et al. ............ 709/230 |
| 7,836,051 B1 * | 11/2010 | Mason ...................... 707/734 |
| 7,890,510 B2 * | 2/2011 | Aggarwal et al. .......... 707/737 |
| 8,180,777 B2 * | 5/2012 | Duchon et al. ............. 707/738 |
| 2002/0107853 A1 | 8/2002 | Hofmann et al. |
| 2004/0078188 A1 | 4/2004 | Gibbon et al. |
| 2004/0113942 A1 | 6/2004 | Tomlyn |
| 2004/0163035 A1 | 8/2004 | Ariel et al. |
| 2005/0021679 A1 | 1/2005 | Lightman et al. |
| 2005/0159970 A1 * | 7/2005 | Buyukkokten et al. ........ 705/1 |
| 2006/0015390 A1 * | 1/2006 | Rijsinghani et al. ........... 705/10 |
| 2006/0047639 A1 | 3/2006 | King et al. |
| 2006/0053097 A1 | 3/2006 | King et al. |
| 2006/0195361 A1 * | 8/2006 | Rosenberg ................... 705/14 |
| 2007/0067210 A1 * | 3/2007 | Rishell et al. ................ 705/10 |
| 2007/0174304 A1 | 7/2007 | Shrufi et al. |
| 2007/0180066 A1 * | 8/2007 | Sherwood et al. ........... 709/220 |
| 2008/0077574 A1 | 3/2008 | Gross |
| 2008/0189122 A1 * | 8/2008 | Coletrane et al. ............ 705/1 |
| 2008/0189169 A1 * | 8/2008 | Turpin et al. ................ 705/10 |
| 2008/0275849 A1 * | 11/2008 | Basu et al. ................... 707/3 |
| 2008/0275861 A1 | 11/2008 | Baluja et al. |
| 2008/0288596 A1 | 11/2008 | Smith et al. |
| 2008/0294678 A1 | 11/2008 | Gorman et al. |
| 2008/0313000 A1 | 12/2008 | Degeratu et al. |
| 2009/0048904 A1 * | 2/2009 | Newton et al. .............. 705/10 |
| 2010/0293048 A1 * | 11/2010 | Singolda et al. ............ 705/14.43 |
| 2011/0270774 A1 * | 11/2011 | Varshavsky et al. ......... 705/319 |
| 2012/0066212 A1 * | 3/2012 | Jennings ..................... 707/723 |

\* cited by examiner

|  | | Topic | | | | | | | | | |
|---|---|---|---|---|---|---|---|---|---|---|---|
|  | | 1 | 2 | 3 | 4 | 5 | 6 | 7 | 8 | 9 | 10 |
| User | A | 0.04 | 0.05 | 0.00 | 0.04 | 0.38 | 0.08 | 0.31 | 0.00 | 0.05 | 0.05 |
|  | B | 0.03 | 0.02 | 0.05 | 0.00 | 0.00 | 0.37 | 0.28 | 0.02 | 0.03 | 0.19 |
|  | C | 0.05 | 0.08 | 0.01 | 0.01 | 0.06 | 0.66 | 0.04 | 0.06 | 0.02 | 0.02 |
|  | D | 0.00 | 0.08 | 0.00 | 0.08 | 0.35 | 0.09 | 0.13 | 0.08 | 0.11 | 0.08 |
|  | E | 0.00 | 0.01 | 0.01 | 0.00 | 0.19 | 0.26 | 0.01 | 0.22 | 0.29 | 0.00 |
|  | F | 0.00 | 0.00 | 0.78 | 0.00 | 0.00 | 0.21 | 0.00 | 0.00 | 0.00 | 0.00 |

Table 1A

|  | | Topic | | | | | | | | | |
|---|---|---|---|---|---|---|---|---|---|---|---|
|  | | 1 | 2 | 3 | 4 | 5 | 6 | 7 | 8 | 9 | 10 |
| User | A | 0.95 | 0.23 | -0.45 | 0.68 | 1.27 | -0.94 | 1.29 | -0.73 | -0.30 | -0.12 |
|  | B | 0.59 | -0.50 | -0.30 | -0.65 | -0.94 | 0.42 | 1.13 | -0.54 | -0.52 | 1.86 |
|  | C | 1.15 | 1.20 | -0.41 | -0.34 | -0.61 | 1.76 | -0.68 | -0.10 | -0.57 | -0.54 |
|  | D | -0.90 | 1.09 | -0.45 | 1.73 | 1.10 | -0.86 | 0.04 | 0.16 | 0.24 | 0.31 |
|  | E | -0.90 | -0.89 | -0.42 | -0.71 | 0.14 | -0.07 | -0.85 | 1.91 | 1.92 | -0.75 |
|  | F | -0.90 | -1.13 | 2.04 | -0.71 | -0.95 | -0.31 | -0.94 | -0.71 | -0.77 | -0.76 |

Table 2A

|  | A | B | C | D | E | F |
|---|---|---|---|---|---|---|
| A | 1.00 | | | | | |
| B | 0.18 | 1.00 | | | | |
| C | -0.03 | 0.69 | 1.00 | | | |
| D | 0.85 | -0.04 | 0.01 | 1.00 | | |
| E | 0.08 | 0.10 | 0.47 | 0.39 | 1.00 | |
| F | -0.28 | 0.05 | 0.11 | -0.36 | -0.13 | 1.00 |

Table 1B

|  | A | B | C | D | E | F |
|---|---|---|---|---|---|---|
| A | 1.00 | | | | | |
| B | 0.03 | 1.00 | | | | |
| C | -0.27 | 0.04 | 1.00 | | | |
| D | 0.37 | -0.45 | -0.40 | 1.00 | | |
| E | -0.49 | -0.44 | -0.24 | -0.04 | 1.00 | |
| F | -0.42 | -0.10 | -0.13 | -0.37 | -0.05 | 1.00 |

Table 2B

FIG. 3

| ID | 223 | 260 | 278 | 283 | 334 | 350 | 354 | 358 | 359 | 380 | 387 | 397 | 4 | 94 | Indegree Centrality |
|---|---|---|---|---|---|---|---|---|---|---|---|---|---|---|---|
| 223 | ■ | - | 0.02 | 0.05 | - | 0.03 | 0.02 | 0.04 | - | - | 0.01 | - | 0.01 | 0.02 | 0.20 |
| 260 | 0.00 | ■ | 0.02 | - | - | 0.12 | 0.03 | 0.20 | 0.00 | - | 0.10 | - | 0.01 | 0.00 | 0.48 |
| 278 | 0.02 | 0.17 | ■ | 0.07 | 0.06 | 0.01 | 0.16 | 0.02 | 0.01 | 0.01 | 0.01 | 0.08 | 0.04 | 0.02 | 0.66 |
| 283 | - | 0.06 | 0.06 | ■ | 0.13 | - | 0.19 | - | - | - | - | - | 0.13 | 0.13 | 0.69 |
| 334 | - | 0.04 | 0.03 | 0.26 | ■ | 0.01 | 0.02 | 0.01 | 0.14 | - | 0.00 | 0.01 | 0.25 | 0.04 | 0.81 |
| 350 | - | 0.15 | 0.09 | - | - | ■ | 0.08 | 0.23 | - | - | - | - | 0.19 | 0.01 | 0.75 |
| 354 | 0.02 | - | 0.04 | 0.05 | - | 0.11 | ■ | 0.09 | - | - | 0.05 | - | 0.11 | 0.32 | 0.79 |
| 358 | - | 0.37 | 0.32 | - | - | - | - | ■ | - | - | - | - | - | - | 0.68 |
| 359 | - | - | 0.02 | - | 0.19 | - | 0.05 | 0.03 | ■ | 0.03 | 0.02 | - | 0.02 | - | 0.36 |
| 380 | 0.07 | - | 0.02 | - | - | 0.01 | - | 0.01 | - | ■ | - | - | - | 0.07 | 0.17 |
| 387 | - | 0.49 | 0.05 | 0.06 | - | 0.02 | 0.02 | 0.05 | - | - | ■ | - | - | - | 0.68 |
| 397 | - | 0.07 | 0.06 | 0.01 | 0.07 | 0.09 | 0.04 | 0.08 | 0.08 | - | 0.00 | ■ | 0.15 | 0.04 | 0.68 |
| 4 | - | 0.02 | 0.08 | 0.29 | 0.15 | 0.12 | 0.03 | 0.14 | 0.00 | - | 0.00 | - | ■ | 0.03 | 0.87 |
| 94 | 0.02 | 0.02 | 0.01 | 0.03 | 0.01 | 0.03 | 0.17 | 0.03 | 0.00 | 0.00 | 0.00 | 0.00 | 0.03 | ■ | 0.36 |
| Outdegree Centrality | 0.12 | 1.39 | 0.82 | 0.83 | 0.59 | 0.53 | 0.79 | 0.93 | 0.23 | 0.05 | 0.21 | 0.09 | 0.93 | 0.68 | |

FIG. 10

| ID | 108 | 223 | 260 | 278 | 283 | 322 | 328 | 334 | 350 | 354 | 358 | 359 | 380 | 387 | 394 | 94 | Indegree Centrality |
|---|---|---|---|---|---|---|---|---|---|---|---|---|---|---|---|---|---|
| 108 | - | 0.07 | 0.07 | 0.23 | 0.17 | - | - | 0.10 | - | 0.17 | - | - | - | - | 0.03 | 0.13 | 0.97 |
| 223 | 0.03 | - | 0.10 | 0.30 | 0.13 | - | - | 0.03 | - | 0.20 | - | - | - | - | 0.07 | 0.10 | 0.97 |
| 260 | 0.03 | 0.07 | - | 0.20 | 0.07 | - | - | 0.07 | - | 0.23 | - | - | - | - | 0.07 | 0.23 | 0.97 |
| 278 | 0.25 | 0.15 | 0.05 | - | 0.10 | - | - | - | - | 0.35 | - | - | - | - | - | - | 0.90 |
| 283 | 0.05 | 0.05 | - | 0.05 | - | 0.05 | - | 0.25 | - | 0.25 | - | - | - | - | - | 0.15 | 0.85 |
| 322 | 0.03 | 0.03 | 0.03 | 0.27 | 0.13 | - | - | 0.13 | - | 0.33 | - | - | - | - | 0.03 | - | 1.00 |
| 328 | 0.20 | 0.07 | 0.03 | 0.23 | 0.07 | - | - | 0.10 | - | 0.23 | - | - | - | - | 0.03 | 0.03 | 1.00 |
| 334 | - | 0.03 | 0.03 | 0.30 | 0.23 | - | - | - | - | 0.20 | - | - | 0.07 | - | - | 0.07 | 0.93 |
| 350 | - | 0.07 | - | 0.20 | 0.10 | - | - | 0.03 | - | 0.30 | - | - | - | - | - | 0.23 | 0.93 |
| 354 | 0.15 | 0.05 | 0.05 | 0.25 | 0.10 | - | - | 0.10 | - | - | - | - | - | - | 0.10 | 0.20 | 1.00 |
| 358 | 0.10 | 0.05 | 0.05 | 0.15 | 0.15 | - | - | 0.10 | - | 0.25 | - | - | - | - | - | 0.15 | 1.00 |
| 359 | - | - | - | 0.35 | 0.20 | - | - | 0.15 | - | 0.25 | - | - | - | - | - | 0.05 | 1.00 |
| 380 | - | - | - | - | - | - | - | - | - | - | - | - | - | - | - | - | 0.00 |
| 387 | 0.10 | 0.10 | - | 0.30 | 0.10 | - | - | 0.10 | - | 0.10 | - | - | - | - | - | 0.20 | 1.00 |
| 394 | 0.10 | - | 0.10 | 0.23 | 0.10 | - | - | 0.07 | - | 0.20 | - | - | - | - | - | 0.13 | 0.93 |
| 94 | 0.10 | 0.10 | - | 0.15 | 0.25 | - | - | 0.10 | - | 0.25 | - | - | - | - | - | - | 0.95 |
| Outdegree Centrality | 1.15 | 0.83 | 0.52 | 3.22 | 1.90 | 0.05 | - | 1.33 | - | 3.32 | - | - | 0.07 | - | 0.33 | 1.68 | |

Table 3

| ID | 108 | 223 | 260 | 278 | 283 | 322 | 328 | 334 | 350 | 354 | 358 | 359 | 380 | 387 | 394 | 94 |
|---|---|---|---|---|---|---|---|---|---|---|---|---|---|---|---|---|
| 108 | - | 0.03 | (0.03) | 0.21 | 0.14 | (0.02) | (0.02) | 0.08 | (0.01) | 0.10 | (0.03) | (0.03) | - | - | 0.02 | (0.12) |
| 223 | (0.20) | - | 0.10 | 0.30 | 0.12 | - | - | 0.03 | (0.01) | 0.19 | (0.01) | - | - | (0.00) | 0.06 | 0.09 |
| 260 | (0.04) | 0.07 | - | 0.19 | 0.07 | (0.01) | - | 0.07 | (0.04) | 0.22 | (0.06) | (0.00) | - | (0.03) | (0.00) | 0.23 |
| 278 | 0.16 | 0.14 | (0.00) | - | 0.08 | (0.00) | (0.00) | (0.02) | (0.00) | 0.30 | (0.01) | (0.00) | (0.00) | (0.00) | - | (0.01) |
| 283 | 0.00 | 0.05 | (0.02) | 0.03 | - | 0.04 | (0.01) | 0.19 | - | 0.16 | (0.03) | (0.02) | - | - | (0.03) | 0.09 |
| 322 | 0.01 | 0.03 | 0.03 | 0.25 | 0.12 | - | (0.08) | 0.10 | - | 0.31 | (0.02) | (0.20) | - | (0.02) | 0.03 | (0.00) |
| 328 | 0.18 | 0.07 | 0.03 | 0.23 | 0.05 | (0.06) | - | (0.23) | (0.00) | 0.21 | (0.00) | (0.22) | - | (0.00) | 0.03 | 0.03 |
| 334 | (0.01) | 0.03 | 0.02 | 0.29 | 0.14 | (0.03) | (0.08) | - | (0.00) | 0.18 | (0.01) | (0.08) | 0.07 | (0.00) | (0.01) | 0.00 |
| 350 | (0.07) | 0.07 | (0.04) | 0.17 | 0.10 | - | - | 0.03 | - | 0.28 | (0.06) | - | - | - | - | 0.23 |
| 354 | 0.09 | 0.05 | 0.05 | 0.24 | 0.05 | (0.02) | (0.02) | 0.08 | (0.03) | - | (0.05) | (0.02) | - | (0.01) | 0.09 | (0.17) |
| 358 | 0.05 | 0.05 | (0.05) | 0.06 | 0.08 | (0.00) | (0.00) | 0.09 | - | 0.18 | - | - | - | - | (0.10) | (0.10) |
| 359 | (0.02) | - | - | 0.35 | 0.18 | (0.15) | (0.09) | 0.05 | - | 0.22 | (0.01) | - | (0.01) | (0.00) | (0.00) | 0.05 |
| 380 | (0.05) | (0.02) | - | (0.01) | - | - | - | (0.00) | - | (0.00) | - | - | - | - | - | (0.02) |
| 387 | 0.09 | 0.10 | (0.14) | 0.29 | 0.08 | (0.04) | - | 0.10 | (0.00) | 0.10 | (0.01) | - | - | - | (0.04) | 0.20 |
| 394 | 0.00 | - | 0.07 | 0.20 | (0.00) | (0.01) | (0.00) | 0.06 | (0.03) | 0.20 | (0.08) | (0.00) | - | (0.03) | - | 0.13 |
| 94 | (0.22) | 0.09 | (0.00) | 0.15 | 0.21 | (0.00) | (0.00) | 0.03 | (0.01) | 0.11 | (0.02) | (0.00) | (0.00) | (0.00) | (0.01) | - |

Table 4

FIG. 12

SYSTEMS AND METHODS FOR ANALYZING ENTITY PROFILES

CROSS-REFERENCE TO RELATED APPLICATIONS

This application claims benefit of U.S. Provisional Patent Application No. 61/056,625 filed 28 May 2008 and entitled "SYSTEMS AND METHODS FOR COMPARING ENTITY KNOWLEDGE AND ENTITY NETWORK KNOWLEDGE" the entire contents of which are herein incorporated in their entirety.

STATEMENT REGARDING FEDERALLY SPONSORED RESEARCH OR DEVELOPMENT

This invention was made with Government support under Contract #W31P4Q-06-C-0398 awarded by the U.S. Army Aviation & Missile Command, Contract #W31P4Q-08-C-0265 awarded by the U.S. Army Aviation & Missile Command and Contract #FA8750-06-C-0099 awarded by the U.S. Air Force. The Government has certain rights in the invention.

INCORPORATION-BY-REFERENCE OF MATERIAL SUBMITTED ON A COMPACT DISC OR AS A TEXT FILE VIA THE OFFICE ELECTRONIC FILING SYSTEM (EFS-WEB)

Not Applicable

BACKGROUND OF THE INVENTION

1. Field of the Invention

Embodiments of this invention relates to systems and methods to analyze entity profiles, in particular, embodiment relate to analyze attributes and interactions of entities in a minimally invasive manner. In embodiment, that analysis is used to share attribute and interaction data and used to determine degrees of similarity of entities.

2. Description of the Prior Art

The emergence of the information society and net-centric military were expected to help organizations reach new levels of performance. As information can now be passed over long distances without effort, increasingly complex activities that rely on collection and integration of information which were previously unavailable can be attempted. Network-enabled environments allow geographically separated individuals with niche skill sets to interact to create ever more innovative solutions to difficult problems. Unfortunately, as the numbers of people an individual interacts with increases, it is more and more difficult for a given individual to retain a "running tally" of the interests of all of their colleagues. When these individuals are overloaded with the complexity of their environment, they often concentrate their efforts on their local tasking, limiting their interactions with others to happenstance. This closes many avenues for collaboration and leads to inefficiencies.

Relying on rigid bureaucratic hierarchies does not solve the problem of connecting people with overlapping interests, particularly in cases where the mission or situation poses an unusual challenge (one for which the bureaucracy has no processing mechanism), requires coordinated execution of new methods, or requires the involvement of new team members. While these organizations may easily manage a few well understood scenarios, they are simply not matched to the problems of dynamic environments. The development of more flexible "hybrid" organizations that combine functional and hierarchical structures may provide an alternative in these cases, but that solution may still be far from ideal. Under the continuously changing circumstances of the modern world, it is unlikely that there will be any single organizational structure and process that is capable of addressing every situation. A third solution is to frequently restructure the organization in response to changing mission requirements. This requires a detailed analysis of the tasks and challenges currently facing an organization and then "re-wiring" the people and resources into a more efficient and effective form. This solution falls short of optimal, as well because (1) it requires the organization to be reconfigured every time there is significant change, (2) it demands a great deal of time and energy towards reconfigurations, and (3) it typically is met with significant resistance by conservative members of an organization. In short, changes in organizational structure alone are not sufficient to ensure optimal coordination because structural flexibility comes with unavoidable costs.

Corporations, government entities, and military teams need a tool that supports many organizational structures, while automatically detecting and initiating collaboration across organizational branches on an as-needed basis. There has a been some progress made in spontaneously generating collaborations through the use of knowledge management systems and by analyzing digital content to find links and connections within organizations (see IBM's Workplace Collaboration Services and Tacit's ActiveNet™). However, these solutions generally rely heavily on user input and user-initiated searches for like-minded individuals. They tend also to track only digital information that is on organization servers, leaving out a great deal of information available on that individual's local computer.

Organizational charts and manuals of doctrinal processes define roles, methods, and best practices for common missions and activities. But these same structures often force organizations to behave inefficiently—often ineffectively—on problems in new domains or problems that require new coordination methods and dynamic teams. Many organizations lack mechanisms for flexibility in the face of changing circumstances, and the results can be devastating. Often, organizations have personnel with the right skill sets to meet a particular challenge or to create innovative solutions to difficult problems, but those individuals do not know about the interests and skills of others in their organizations. Maintaining an accurate awareness of others' knowledge is cognitively infeasible for large organizations. As a result, the organization is vulnerable to two types of risks resulting from missed opportunities for collaboration: (1) a reduction in the quality of the organization's work products and the effectiveness of its response to the environment, and (2) an increase in productivity costs due to "reinvention of the wheel" by members unaware of other members' work in an area.

Furthermore, not all information is readily available in a digital form; much interaction in the workplace is still informal, occurring in the world of flesh-and-blood interaction. Studies of office interactions have discovered that 35-80% of work time is spent in spoken conversation, where 14-93% of work time is spent in opportunistic communication, and 7-82% of work time is spent in meetings (Allen, 1997). Face-to-face interaction within the workplace is central to information flow, particularly for senior managers (Nardi & Whittaker, 2002). Much critical information is transmitted by word of mouth in a serendipitous fashion. The money and time spent on business travel and conferences further underscores the value of face-to-face interactions. Thus to understand information flow within a human organization, we must understand not only the digital information produced and accessed but also what happens in spoken conversation.

Therefore, a tool is needed to facilitate rapid formation of effective human networks in a system that non-invasively monitors the rich content of digital media and conversation, builds knowledge of ad hoc and potential networks, and accurately recommends new opportunities for collaboration.

BRIEF SUMMARY OF THE INVENTION

Embodiments of the subject invention comprise a computer-based system and methods to collect and compare the attributes of a group of entities and using data representing attributes of the entity and interaction data between entities. Embodiments of the invention comprise using minimally invasive means to automatically collect and model both an entity's attributes such as their knowledge/work/interest as well as model the social interactions of the entity together with a means to identify opportunities to influence changes in the entity attributes. Minimally invasive means to collect and model attributes include semantic analysis and topic modeling techniques. Means to model social interactions include social network analysis techniques that can incorporate location data of the entity. Embodiments of the invention further provide a sharable index of the attributes of the entities and the group of entities.

It is an object of an embodiment of the present invention to provide a computer-based method of profiling entity information by automatically determining an interaction model of a set of interaction information from a group of entities. In some of these embodiments, the interaction information comprises entity communication information and entity location information.

It is another object of an embodiment of the invention to provide a computer-based method of profiling entity information wherein the step of determining the interaction model is automatically determined using techniques such as semantic analysis, topic modeling, or social network modeling on entity communication information resident on a computing device of the entity.

It is a further object of an embodiment of the invention to provide a computer-based method of profiling entity information further comprises automatically determining a topic model from at least two entities from the group of entities, determining an entity topic profile for the at least two entities, and comparing entity topic profiles to identify a degree of topic similarity of the at least two entities whereby changes in the entity topic profile can be identified to influence the similarity of the entity topic profiles.

It is yet another object of an embodiment to provide a computer-based method of profiling entity information further including the steps of determining an entity topic comparison function to identify a degree of topic similarity of the at least two entities, determining an entity interaction profile from the interaction matrix for the at least two entities, comparing entity interaction profiles to identify a degree of interaction similarity of the at least two entities, and comparing the degree of topic similarity and the degree of interaction similarity of the at least two entities whereby changes in the entity interaction profile can be identified to influence the similarity of the entity topic profiles.

It is an object of one embodiment of the invention to provide an entity profiling system for analyzing entity profiles including a system bus, at least one database in communication with the system bus that includes entity data and interaction data associated with at least one entity, an analysis engine in communication with the system bus comprising, a model, comparison and recommendation engine comprising machine instructions capable of comparing entities by the topic profile and the interaction profile, and at least one processor in communication with the system bus capable of executing the machine instructions of the analysis engine, and the system bus capable of communicating with a user interface for providing user input to support the operation of the entity profiling system.

It is another object of an embodiment of the invention to provide an entity profiling system wherein the topic profile comprises a representation of attributes of the entity and the interaction profile comprises a representation of entity communication information. In some embodiments, the entity interaction data comprises entity location information.

It is another object of embodiment of the invention to provide an entity profiling system wherein the model, comparison and recommendation engine further comprises machine instructions capable of executing social networking techniques to generate an interaction model, an interaction profile, a topic model and a topic profile. In some embodiments, the model, comparison and recommendation engine further comprises machine instructions capable of comparing the topic profile and the interaction profile.

It is an object of one embodiment of the invention to provide a computer-based method of profiling entity information comprising the steps of automatically determining a topic model representing at least one attribute of a group of entities, determining an entity topic profile of at least one entity representing the attributes of the entity, and allowing the entity topic profile to be shared over a data network.

It is another object of one embodiment of the invention to provide a computer-based method of profiling entity information wherein the topic model is capable of being communicated and stored in a memory accessible to a data network, the entity topic profile is capable of being communicated and stored in the memory, and the step of allowing the entity topic profile to be shared further comprises storing the topic profile as an index in a format accessible to other entities on the data network.

BRIEF DESCRIPTION OF THE DRAWINGS

FIG. 3 shows one embodiment of tables illustrating topic profiles and corresponding correlations between the individuals.

FIG. 10 shows a table illustrating one embodiment of an interaction matrix identifying email centrality.

FIG. 12 shows tables illustrating one embodiment of an interaction matrix identifying knowledge centrality and interest potential.

DETAILED DESCRIPTION OF THE INVENTION

Figure 1:
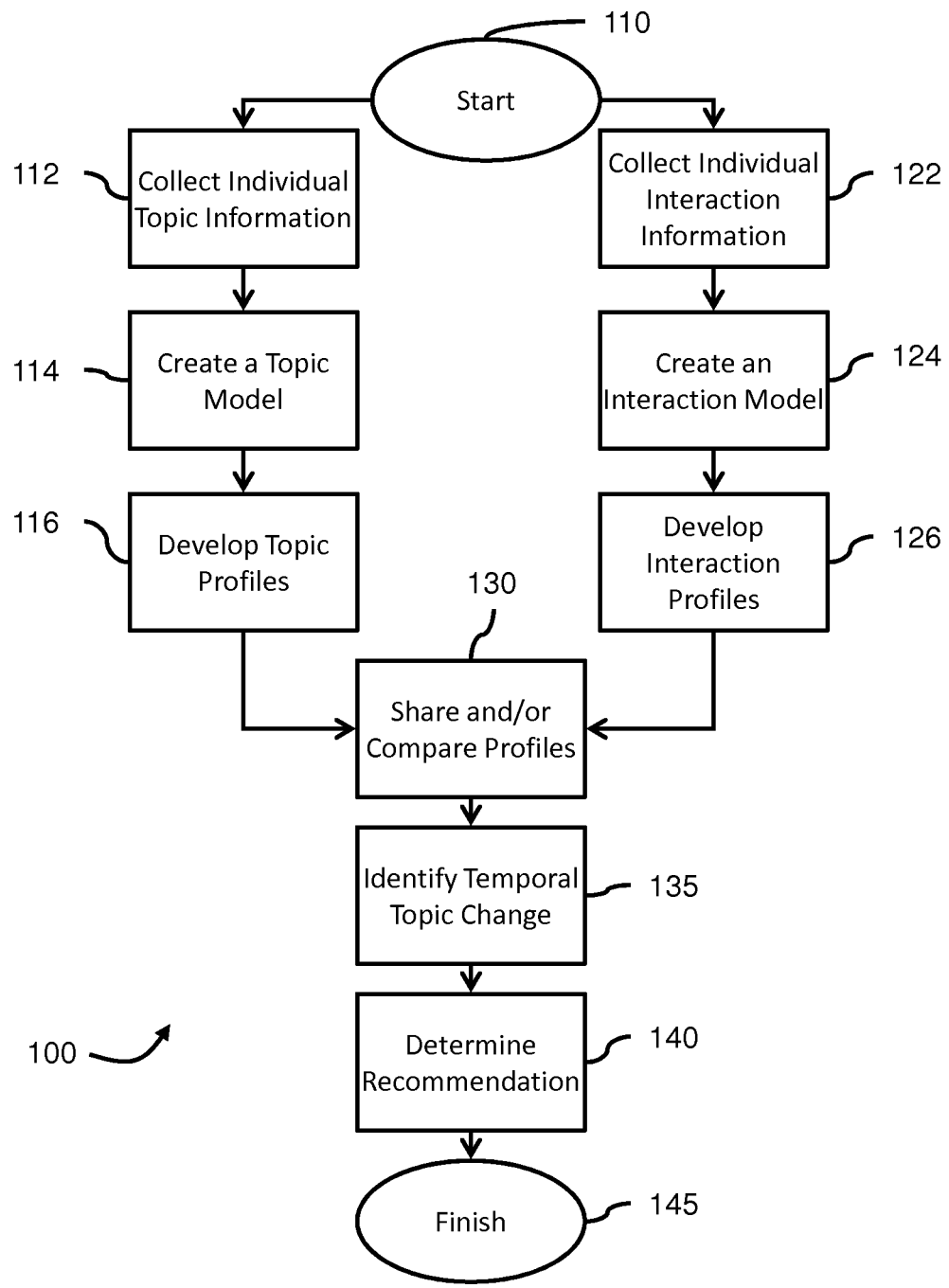
FIG. 1 shows a process diagram of one embodiment of a method of analyzing entity profiles.

The entity profiling system and methods for analyzing described below comprise one embodiment of the subject invention. The use of the entity profiling system embodiment in the description is for illustration purposes and is not intended to be limiting. Other embodiments of the systems and methods described, as would be contemplated by a person in the art, are contemplated and included in this description.

As used throughout this description, the following terms have the following meanings Attribute: A characteristic or feature of an entity or a group of entities that can be distinguished by content, time, place, and/or entity.

Automatically: Having the capability of starting, operating, moving, etc., independently. One example includes executing machine instructions on a periodic or event based interval without the need for a user to actively participate in the execution of the instructions.

Collaboration: The sharing of information between two or more individuals on a particular common work area.

Domain Knowledge: A statistical representation of a finite number of topics for a given entity.

Entity: A person, group, organization, thing or set of information. An entity can also include a hypothetical entity such as may be represented by a set of topics or interaction data.

Topic Model: A statistical model of a finite number of topics for a body of information. A topic (z) is a conditional probability of the topic over a set of topics, and in one embodiment, the set of topics is words (w) such that $P(w|z)$.

Topic Profile: A statistical representation of topics for a given set of data. A topic profile is a set of one or more topic values which may or may not be ordered. For example and not for limitation, a topic profile can include numerical representations of one or more topics or topic values. In some embodiments, a topic profile may include vectors as numerical representations.

Index: A defined and sharable structure for the collection, storage and retrieval of attributes associated with one more entities.

Information: Any type of data communicated, received or stored related to a particular entity, characteristic, attribute, activity, fact or circumstance. Information also includes any type of data that is forecasted, projected or desired to occur or have occurred at any time.

Interaction: An action or lack of action between multiple entities. An interaction between entities may include, but is not limited to activities such as communication between entities such as conversations, emails, letters, text messaging, phone calls and it may also include physical actions such as proximity, location, visual symbols or the like.

Interaction Model: A statistical model of interactions for a given entity to one or more additional entities.

Interaction Profile: A statistical representation of interactions for a given entity to one or more additional entities.

Interaction Sensor: A device capable of logging, location and collocation of entities along with other attributes describing aspects of entity to entity interactions.

Location Information: Information relating to the physical location of an entity or information that can only be gathered by being at the physical location of the entity. Location information includes but is not limited to physical position, proximity of the entity to other entity and/or objects, visual scenes at or near the entity or other sense data at or near the entity.

Profiling: The act or process of defining a profile. A profile is a set of characteristics, attributes or qualities that identify a type or category of entity.

Similarity: A measurement of attributes, characteristics or other information that determines to what degree entities are similar or share commonalities. A similarity includes a measure that reflects the degree of commonality as well as the degree of difference.

As described below, the entity profiling system embodiment utilizes the characteristics of an entity such as an individual's knowledge, work tasks or other interests. It is also understood and contemplated that embodiments of this invention are able to treat other characteristics of an individual, or any other entity as a set of data to be compared to another data set. For example, entities may include, but are not limited to materials, equipment, systems, teams, raw data sets, documents, graphic images or any other entity with multiple characteristics. Characteristics may include, but are not limited to knowledge, work tasks, interests, material composition, system capabilities, document/image content or any other possible ways to define traits of an entity. As described below, the entity profiling system embodiment also utilizes the social characteristics of a group of entities such as an individual's interactions, communications, group knowledge and other group traits. It is also understood and contemplated that embodiments of this invention are able to treat other characteristics of a group of entities, or any other organization of entities as a set of data to be compared to another data set. For example, a group of entities may include, but are not limited to teams, social groups, company employees, demographic groups, ethnic groups or any other entity comprised of other entities. Characteristics may include, but are not limited to social interaction, communications, physical locations or any other possible way to define the interaction or other networking of a group of entities.

One Embodiment of Methods for Analyzing Entity Profiles:

In general, the disclosed methods for analyzing entity profiles assist in indexing of entity knowledge as well as connecting the organizational "dots" of organizations or groups of data. In one embodiment, the methods help facilitate rapid formation of effective human networks and accurately recommend new opportunities for collaboration. The entity profile system and methods of its use are able to increase the efficiency of organizations by profiling and optimizing the patterns of creative interaction in an organization. The disclosed methods non-invasively monitor the rich content of digital media and social interaction, build knowledge of informal and potential networks, and then use this information to recommend situation-relevant interpersonal connections that may be missed. In maintaining situational awareness within an organization there are two competing risks of information disparity and information overload. One benefit of the disclosed methods is that they drastically reduce both of these risks by maintaining an accurate, global awareness of the organization's knowledge and ensuring that only value-adding opportunities for collaboration are detected and pushed to the organization's members in a timely fashion.

Use of embodiments of these methods connects entities in organizations by integrating three technologies into a single system: 1) text analysis of digital documents and communications to construct an organizational model of members' areas of knowledge/work; 2) interaction analysis of digital communication and sensor based interactions; 3) methods for identifying and initiating collaboration between members of the organization. The text analysis creates a formal representation of a user's interests or knowledge based on the documents they read and store in the context of the organization's knowledge as a whole. This allows a ready comparison of interests among people in an organization where, over different time periods, some people will have similar interests and some will have divergent interests. When trying to discover people with temporally overlapping interests, the text analysis provides a viable, automated method. However, there are other patterns of interactions within an organization, including those supported by electronically mediated communication (i.e., e-mail, Instant Messaging [IM], text chat) and those that occur through face-to-face interactions that indicate the current interactions that can also be utilized. By analyzing these components separately—and then comparing the topic similarity with the derived interaction information—the disclosed methods can discover untapped, potentially important connections. These methods can also be enhanced to analyze profiles across ongoing time windows.

As shown in FIG. 1, the general embodiments of the methods for analyzing entity profiles 100 start with step 110 and further included the steps of collecting individual topic information 112, creating a global topic model 114, developing entity topic profiles 116 and interaction profiles, sharing and/or comparing profile information 130, identifying temporal topic changes 135 and determining recommendations 140 or opportunities for collaboration based on the similarities of profile information and concludes with step 145. In embodiments, the methods further include collecting interaction information 122, creating a global interaction model 124 and developing interaction profiles 126 that can be used in the step of sharing and comparing profiles 130. In embodiments with individuals on a computer network, historical entity data will be collected by uploading entity-specified documents. In addition, entity interaction data will be assembled from email messages and others sources, such as wearable sensors. This data is used to create both entity and interaction profiles. As users create new documents, periodic temporal evaluations by a collaboration engine will identify new opportunities by comparing the documents and entity profiles in relation to the user's network ties in the organizational network. Each of these tasks is discussed in more detail in the following sections.

In specific embodiments, the systems and methods are able to develop entity profiles of individuals, build interaction profiles of the individuals in an organization and identify opportunities for collaboration based on the entity and interaction profiles.

One intent of embodiments of these systems and methods is to integrate information gathered from multiple sources—topics of interest, communications-based social network, face-to-face interaction—to provide recommendations to members of an organization about new avenues of potential collaboration.

Collecting Topic Information and Create Topic Models:

Referring to FIG. 1, the steps of 112 and 114 comprise collecting individual topic information and creating a topic model. The creation of a topic model assists in developing an entity topic profile that generally represents the characteristics of that entity. In the case of an individual in an organization, an entity profile can comprise a collection of that individual's domain knowledge such as interests, skills or other attributes. The entity profiling system develops topic models and topic profiles by collecting topic information, such as text, from designated file locations on an entity's computing device. The system creates a superset of topics from the group of entities and uses this superset, or topic model, to create the topic profiles specific to each entity.

Figure 2:
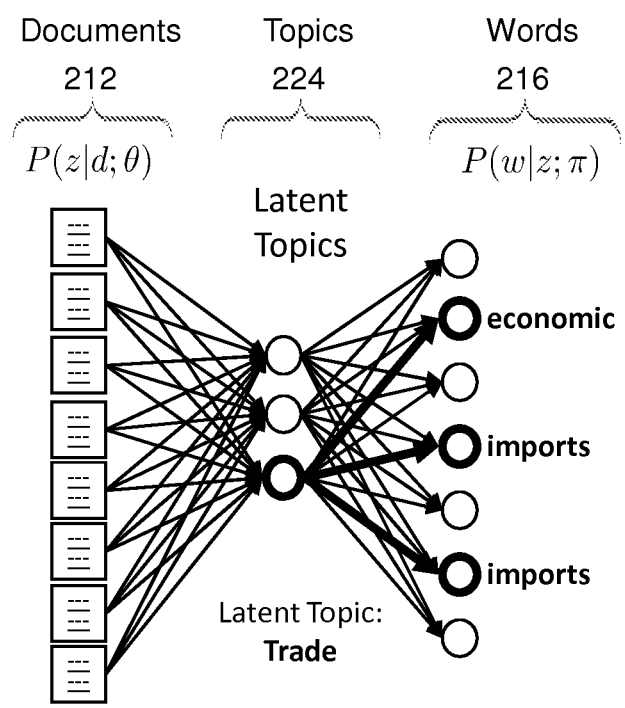
FIG. 2 shows a functional diagram of one embodiment of modeling entity knowledge using pLSA.

As shown in FIG. 2, many different sources of data can be used to construct a statistical model of the domain knowledge of an individual. The documents 212 that people read can be construed as a reflection of their interests. Although an imperfect proxy, documents such as news articles, technical reports, and topical presentations accessed or stored locally on a computer can be used to surmise the interests of that individual. Using advanced text analysis techniques, such as topic modeling techniques like probabilistic latent semantic analysis (pLSA), one can calculate the probability of words 216 from documents 212 and associate them with topics 224. From this model, topic profiles for each individual in an organization can be created to reflect a collection of topics representing that individual's domain knowledge. These articles, reports, and presentations resident on an individual's computer can be seen as a reflection of the work they are doing and the interests they have and thereby develop a conceptual representation of a user's domain knowledge. These profiles are then used to analyze both changes in workflow or knowledge as well as to identifying opportunities for collaboration. Contemplated techniques for accomplishing FIG. 1 steps 112 and 114 (and at times steps 122 and 124) in terms of their utility in being used to determine similarity and complementarity between individuals included keyword indexing, clustering, probabilistic latent semantic analysis (pLSA), latent Dirichlet allocation (LDA), and support vector machines (SVM). Key word indexing is a suitable simple technique that can easily be implemented to help develop a topic model. In using this approach, a "model" of a person would be comprised of a limited number of the top non-common keywords, e.g., using TF-IDF, which is the ratio of the frequency of a word, divided by the frequency of the documents (or in this case, individuals), in which this term occurs. The occurrence number could then be used to weight the strength of each word, and thus provide some indication of a person's work domain. However, there are other modeling techniques that can provide more complete representations of a user's domain knowledge that include the capability to contextualize words. As a result, this technique could provide minimal indications of similarity between individuals.

Implementing a clustering technique would provide a more complex representation of user's domain knowledge. In this case, a user would be represented by the group of words, and users would be clustered together to extent that these words are the same. While this approach is expected to perform better on linking domain knowledge than simple keyword indexing, other techniques could provide better results for more complex document collections.

A topic model technique, such as pLSA, will assign a topic probability to every document and every word in the data being modeled. In some implementations, data are collected from individuals, and each document (email, chat, etc.) is tagged with an anonymous user ID. Therefore, after model training, a "user" can be represented by a topic profile, or a collection of topic probabilities assigned to each document from the model.

In one embodiment, pLSA is used to create a topic model—the set of concepts and the words associated with them—from the documents submitted by the organization's members.

Topic modeling techniques are another method for analyzing and structuring the domain knowledge of the entities. This application also applies to other methods for structuring such the domain knowledge. For example, if the documents are already tagged with information about the contents, such as taxonomic or ontological information, or any other metadata, then this may also be used to create a topic profile for the entity.

We also envision applying other machine learning techniques to obtain this information. For example, we have trained a text classifier on documents from Wikipedia. Every page on Wikipedia is assigned to one or more categories. The documents within a category (and its subcategories) can then be used as training documents for a text classifier, such as a Support Vector Machine (SVM) or any other supervised training method known in the art. By using an open-source, human categorized set of documents for training, then applying this classifier to the user documents, one can know where in the hierarchy all of one's domain knowledge lies. This may hold advantages over a topic modeling approach to creating entity profiles, since now the "topic" is a category within a structured hierarchy which can be navigated easily and whose meaning is more precise.

For example, Wikipedia has a "Science" category (http://en.wikipedia.org/wiki/Category:Science). This category has sub-categories of a variety of types, including scientific organization, history of science, and scientific disciplines. Within the latter category are Applied Sciences, Behavioral Sciences, Mathematics, etc. Each of these also has subcategories, and so on. Thus, in creating an entity profile, we might determine the scientific discipline(s) most relevant to the entity's documents. This also alleviates the need for massive amounts of data required of topic models (because they are statistical and unsupervised). On the other hand, using supervised methods based on open-source information or other more general metadata may not have the specificity required to find points of collaboration in a particular organization. Thus, embodiments of this invention comprise the use of both methods for creating a topic profile of the domain knowledge of an entity.

The entity topic models are also able to recognize the time at which each document is added to the topic model enabling temporal considerations to be made. This information allows for trends in topics to be determined both across the organization as a whole as well as for individual users. In making temporal considerations it is possible to identify when a user engages in new activities, serving as an indicator for new collaboration potential.

Also, although an individual is used throughout this description, it is contemplated that an "individual" may comprise other entities such as, but not limited to, groups of people, teams, organizations, databases or other sources of knowledge/work/interests. An individual may also comprise a fictitious entity, such as an ideal customer, date or mentor, having certain knowledge/work/interests or other traits.

Developing Topic Profiles:

Referring to FIG. 1, step 116, after modeling the group of entities, a "user" can be represented as a topic profile, or a collection of topic probabilities assigned to each document that is associated with the specific user.

To make this more probabilistic, assume that there are N documents in the model, P users, and K topics in the model. The resulting data matrix is an N-x-K matrix where each slot represents the probability of the assignment of topic Kj to document Ni. If we look at only the documents that are associated with a particular user, then we have a subset of the total matrix (say, an M-x-K matrix, where M is the total number of documents associated with a particular user). Therefore, it is possible to represent any given user by transforming this M-x-K matrix into some type of vector representation. Once a vector representation for an individual has been derived, it allows for the comparison across people in the resulting vector space.

One of the challenges for this type of model is to derive a "reasonable" vector representation, given the topic model's output. In one embodiment, the average vector for each topic assigned to each individual's documents can be used. Thus, a 1-x-K average topic vector can be derived for every person in the model. Table 1A in FIG. 3 gives an example that was derived from a small dataset in a field trial. Table 1A shows the average topic vectors for six users in an example data set. Note that, in this example, a significant portion of the topic space is accounted for by Topics 5-7, for 5 of the users. These topics are associated with terms that relate to the trial itself, not unexpectedly. User "E" shows the widest dispersion of topics, and user "F" has the majority of his topic space accounted for by Topic 3.

Deriving a base representation can be accomplished in several ways. In the simple representation above, only topic averages were used. However, it is possible to incorporate other factors into the transformation, such as weighting by document length, and/or weighting by total number of documents submitted by a particular user. In addition since documents are indexed by time, temporal considerations can also be made. For example, a historical profile with a larger time window can be differentiated from a recent activity profile.

Once a base representation has been selected, it may still be prudent to transform the representations further. Such transformations can affect the placement of vectors in the topic-vector space and can have effects on any subsequent similarity comparisons between individual vectors. For example, if every individual is represented as an average over each topic for their associated documents (as above), then it is possible to standardize each individual's vector representation to a zero-mean and a standard deviation of 1 by averaging over each topic dimension and performing a Z-transform on each vector. This has the effect of distributing each topic dimension around zero for the entire set of individuals, and provides a means of introducing negative weights into an individual's representation. Table 2A shows this weighting scheme, or a Z-transformed topic vector for each use in the example data set.

Other transformations are also possible. For example, using the Z-transform as a basis, a binary transformation can be derived by assigning a $-1$ to any negative weight and a $+1$ to any positive weight, thus resulting in a binary representation for each individual. Although such a representation would be of little use in the small data set used here, it would be quite useful when there are hundreds of topics derived from a large (>1 million documents) document collection.

Given the transformations to create individual topic profiles, it becomes possible to compare individuals to assess similarities and differences. Comparison between individuals can occur globally, by using all vector dimensions, or locally, by choosing a subset of dimensions. Using a correlation measure, the Table 1B and Table 2B present comparisons across individuals based on averages, and Z-transforms, respectively. Table 1B shows correlations between individuals using the average vector representations from Table 1A and Table 2B shows correlations between individuals using Z-transformation vector representations from Table 2A.

The type of vector transformation method chosen can have profound consequences on the correlations between people. For example, using the average vectors, individuals B & E of FIG. 3 have a correlation coefficient of 0.1. However, if the Z-transformation method is used, these same individuals have a correlation coefficient of $-0.44$, which is mainly due to the fact that the average vector representation only contains positive entries, while the Z-transform contains negative entries that represent a deviation from the overall average for a topic.

The representations derived for individuals can also serve as representations for the topics themselves. That is, given a set of individuals and topic probabilities, a vector representation for a topic is the collection of individual probabilities assigned by the model to that topic. Thus, the same transformations are available for topic comparison as for individual comparison. These comparisons are useful in discovering which topics naturally cluster together and could serve as a second-order methodology for discovering a clustering for users as well.

Collect Interaction Information, Create Interaction Models and Develop Interaction Profiles:

Additionally, characteristics of an entity can include an interaction profile, such as a social network profile. This type of information is collected and analyzed as steps 122, 124 and 126 of FIG. 1. The combined characteristics of a topic profile and an interaction profile provides a rich description of both an individual's social network and expertise.

Looking at patterns of interactivity—the social network of an organization—provides insight into the status and health of an organization, as those patterns reflect dynamics not easily discerned through casual observation. Embodiments of the entity profile system derive organizational social networks from interactions such as e-mails, instant messaging, time cards, phone calls, web conferences and other collaborative work environments that generate data representing latent structural information about their knowledge, social networks and tasks. This interaction profile can be further supplemented with data collected by interaction sensors such as the Sociometric Badge. This interaction/network data alone can be used to determine organizational inefficiencies, but when combined with the entity topic profile it forms a powerful resource that can be used to compare entities and possibly identifying gaps in collaboration.

In recent years, Social Network analysis has become one of the dominant paradigms in the organization sciences (Borgatti & Foster, 2003). A central claim of this paradigm is that organizational outcomes (like power, team coordination, communication and information sharing) can be explained by the informal structure of relationships among organizational actors. One of the benefits of social network analysis is that it scales well. Typically, nodes in network represent people and ties represent relationships among the nodes, such as communication frequency or friendship. However, nodes can also be used to represent units other than people, such as words and ideas or organizations themselves (Popping & Roberts, 1997). Large organizations generate and store massive volumes of communication data on a regular basis as employees send e-mail and instant messages as a regular part of work. Some of these data sets are particularly well suited to network text analysis. E-mail is a particularly valuable source for communication network data because it is both ubiquitous and contains information about senders and receivers as well as content that can be analyzed using network methods. Specifically, the information contained in the "To," "From" and "CC" fields of e-mail headers can be used to generate matrices that represent patterns in the structure of communication across large groups. By analyzing this type of interaction data, it is possible to create an entity profiling system that acts as an organizational agent, passively monitoring patterns of interest to a given individual and alerting them to emerging opportunities and connections. The analysis of the digital data produced by an organization can be used to provide a fairly robust description of an organization's knowledge areas and formal connections, yet a significant portion of business is done through face-to-face interaction. The value of being able to access this information, as well as the social implications of collecting such information is still under debate. However, recent work done by Alexander Pentland and the MIT Media Lab, indicate that it can be collected in a less intrusive manner while providing invaluable insights into social interactions. For example, sensors can be used to collect and analyze data related to interaction and/or location of the individual. One such interaction sensor is the MIT Media Lab Sociometric Badge, which is a wearable sensor that collects and analyzes data on real-world and face-to-face social interactions. This badge can recognize human activity levels and extract speech features through an embedded accelerometer and microphone in real time (Waber, et al., 2007). In addition, it uses radio signals to detect people in close proximity and capture face-to-face interaction time using an IR sensor. The operation, use and integration of this badge with a computing environment is disclosed in U.S. Pat. No. 6,757,719 to Lightman, Alexander et al., filed Apr. 28, 2000 entitled "Method and system for data transmission between wearable devices or from wearable devices to portal" and U.S. Patent Pub. No. US2005/0021679 to Lightman, Alexander et al. entitled "Method and system for data transmission between wearable devices or from wearable devices to portal" both of which are incorporated herein in their entirety. Similar results are possible with the use of other sensors and sensor data such as may be obtained from a cell phone, Bluetooth transmitters/receivers or GPS transmitters/receivers.

All of the interaction data, be it from email, chat, sensor, badge, or cell phone, is stored and indexed in a database that notes the medium, sender, receiver, date/time, and any related content (i.e. an email body or instant message text). This transaction log allows for summary matrices of person to person interactions to be assembled for different time periods with differing period lengths from different mediums.

The behavioral data collected by the badges have been used in four types of analyses that are considered for use in the entity profiling system: characterization of individual and group distribution and variability, conditional probability of relationships between individual behaviors (which will be referred to as 'influence'), accuracy of behavioral predictions (with equal type I and II error rates), and finally the relationship of these behavioral measures to standard cognitive and cultural metrics.

Privacy is a primary concern for any system, so the Sociometric Badge typically extracts and records only speech features, e.g. energy and spectral features, and not the raw speech signal. Thus, some embodiments, the content of conversations is never recorded, and many (but not all) privacy concerns are alleviated. However, it is understood, that the disclosed sensor/badge systems can be further enhanced to include sensors that detect the subject matter of conversations and convert that data to a format suitable for topic and social network modeling for use with embodiments of this invention.

To detect the occurrence of conversations, speech regions are segmented from the raw audio using one minute intervals. As the first step, spectral features can be extracted as proposed by Basu (2001) that discriminate well between speech and non-speech regions. A two-layer Hidden Markov Model (HMM) is then trained to detect voiced/unvoiced and speaking/non-speaking regions using the features. This method works very reliably even in noisy environment, with less than 2% error at 10 dB SNR.

When two people are nearby and are talking it is likely that they are talking to each other, however we cannot say this with certainty. Results presented in Basu (2001) demonstrate that we can detect whether two people are actually in a conversation by using the fact that the speech of two people in a conversation is tightly synchronized. We can reliably detect when two people are talking to each other by calculating the mutual information of the two voicing streams, which peaks sharply when they are in a conversation as opposed to talking to someone else. This measures works very well for conversations that are at least one minute in duration.

In the context of the entity profiling system, these interaction sensors provide a method for augmenting the social networks derived from digital communication, thereby improving our understanding of the true dynamics of an organization. If critical interactions only occur in face-to-face environments (e.g., during work breaks or cross-team meetings), e-mail derived social networks will not reflect this at all. If, however, the socioscope provides little additional information about organizational dynamics, the increased cost and privacy concerns may outweigh the benefits.

Although an organization is used throughout this description, it is contemplated that an "organization" may comprise other types of groups of entities such as, but not limited to, groups of people, groups of teams, databases or other sources of groups of knowledge/work/interests.

Although the Sociometric Badge has been described in the embodiments above, other methods of collecting proximity or interaction of individuals is possible. Such other embodiments include, but are not limited to the location features of a cell phone, point of sale information or other environmental or location information that can be obtained voluntarily or through network information.

Sharing and/or Comparing Profiles:

Given the analysis of entity data to create topic and interaction models that can be used to represent entities in a common index. Referring to FIG. 1, step 130, this index can be then be shared with that can be applied to each entity. And, given the automated methods of profiling entities with embodiments of the entity profiling system, this index can be created with minimal intervention from the users of the system.

Even though the detailed information collected about an organization through the pLSA topic model and social network is quite useful and informative on its own, it would require a significant amount of effort for individuals to manually sort through it to find opportunities for improvement and greater efficiency through collaboration. The common model and profile format also allows opportunities for new collaborations to be identified through a comparison of the entity topic and interaction profiles. By comparing an individual's recent work against the topic model, it is possible to identify candidate individuals for collaboration. Furthermore, by cross referencing this list against the organizational model using different social network analyses, we can identify new opportunities that are highly relevant can be identified in a timely manner. As an example and not for limitation, these features can be illustrated by comparing a first individual's topic profile against the topic profile of a second individual, to identify a gap in the knowledge of one individual. By analyzing the interaction profiles of the two individuals, a common link between the individuals can be identified as a possible method of collaborating to reduce that knowledge gap. In simplistic embodiments, the topic profiles and the interaction profiles can be represented by two dimensional matrices. These matrices can be compared with methods such as simple subtraction of elements of the matrices to determine comparisons. Information in the topic and interaction matrices can also be combined for further comparisons. These comparison techniques and others can be implemented in computer based systems for generating recommendations.

One of the unique and powerful features of the entity profiling system and methods are the ability to combine text analysis with a range of social network analyses.

Comparison between individuals can occur globally, by using all vector dimensions, or locally, by choosing a subset of dimensions. Using a correlation measure, the Tables 2A and 2B in FIG. 3 present comparisons across individuals based on averages, and Z-transforms, respectively. It is easy to see that the type of vector transformation method chosen can have profound consequences on the correlations between people. For example, using the average vectors, individuals B & E have a correlation coefficient of 0.1. However, if the Z-transformation method is used, these same individuals have a correlation coefficient of −0.44. This is mainly due to the fact that the average vector representation only contains positive entries, while the Z-transform contains negative entries that represent a deviation from the overall average for a topic.

It is worth noting that the representations derived for individuals can also serve as representations for the topics themselves. That is, given a set of individuals and topic probabilities, a vector representation for a topic is the collection of individual probabilities assigned by the model to that topic. Thus, the same sort of transformations are available for topic comparison as exist for individual comparison. These comparisons could be useful in discovering which topics naturally cluster together and could serve as a second-order methodology for discovering a clustering for users as well.

The above discussion demonstrates that it is possible to derive useful representations from a topic model for the purpose of assessing how well individuals correlate over a set of model-related topics. On the one hand, a note of caution is in order. The selection of a specific transformation method (not to mention the selection of a particular comparison) needs to be well motivated, both theoretically, and practically (from the task perspective). This is evident from an inspection of Tables 3 & 4 in FIG. 13. There are profound consequences for each choice that is made in model creation, from the original weighting of terms in the model, to transformations of model outputs, and methods of comparison.

Determining Recommendations:

Despite the richness of this kind of data, organizations have only recently begun to analyze it and use it for management. With step 140 of FIG. 1, the entity profiling system analyzes organizational network data to provide automatic collaboration recommendations. For example, once projects, documents, and other content is characterized on its domain knowledge, we can use social network analysis to identify dyads who are working in similar areas but who are not themselves connected. By identifying these potential gaps in the organizational information networks, we can make suggestions to individuals about the people and knowledge that might benefit them in their current work.

Querying the Topic Model:

One of the benefits of the pLSA model is the ability to submit an entire document as a query against the topic model. This is because the pLSA model is based on the "bag-of-words" assumption that the order of words in the documents can be neglected (that is, the words are exchangeable). This assumption is necessary to reduce the complexity of document indexing. Also, all latent variable models assume that the documents in the repository are also exchangeable—a more plausible assumption. pLSA has been especially successful since it uses a model of probabilistic mixture distribution to represent the generation of the words in the document. As a result, when a document is submitted as a query to the model, the similar documents returned are not required to have the terms within the given document, but rather the highest probabilities for generating those terms in the context of the whole document collection.

To create the list of candidate individuals for collaboration, a set of the user's most recent documents is submitted against the model. The documents submitted are then used to develop knowledge area tie strengths to the documents' owners by summing the total number of documents from each owner. These totals create a directed matrix among all the users that is similar to the social network representation collected from email and the wearable sensors. This representation allows us to apply a variety of social network analyses for isolating and identifying the best candidates for new collaborations.

Additional Interaction Measures:

There are additional measures that can be used to optimize collaboration suggestions instead of relying entirely on the absence of a connection and similarity of work areas.

Information sharing and social influence via informal networks are a critical aspect of how work gets done in organizations. Understanding the formal organization chart and reporting structures only tells part of the story. Indeed, research shows that informal ties like friendship and proximity are better predictors of information seeking than formal reporting relationships and task relationships. Using social network analysis to identify influential people in an organizational communication network is but one of many functions the entity profiling system can include. Because central individuals have more potential to influence others (Brass, 1984), the entity profiling system could use this approach to recommend contacts for people engaged in activities requiring broad support or publicity in an organization. In addition to having more potential to influence others, because they are well connected, central individuals also are likely to have the best awareness of the structure and content of a social network (Casciario, 1998). Therefore, this approach could also be used to enhance social search mechanisms by focusing an individual's information gathering on the people who are likely to have the best overall view of the network's structure.

Additionally, in social network theory, the concept of structural equivalence identifies people who are structurally redundant. That is, two people A and B are structurally equivalent when the pattern of ties between person (a) and the rest of the network is exactly the same as the pattern of ties between person (b) and the rest of the network. Because structurally equivalent actors are likely to share similar views about organizational activities (Walker, 1985) and have access to similar kinds of actors, the entity profiling system can avoid making redundant recommendations by controlling for structural equivalence.

Although the comparison means described above address the opportunities for collaboration, it is contemplated that the comparison means may also be used to identify other overlaps or gaps between the "individual" and the "organization". These overlaps and gaps may comprise, but are not limited to, differences or similarities in knowledge/work/interests. These overlaps and gaps may also comprise or consider the trends in knowledge/work/interests of the individual and the organization.

One Embodiment of the Entity Profiling System:

The following discussion provides a brief, general description of a suitable computing environment in which one embodiment of the present invention may be implemented. The invention will often be practiced on a single computing device, but can also be implemented on a client computing device and/or a server or other remote computing device connected by a communication network. The system comprises a computer-based system for enabling a user to compare and maximize the appropriateness of a group of entities having capabilities for fulfilling a mission having requirements, the computer-based system comprising: memory in which are stored machine instructions that define a plurality of functions; a display; a user input device for input of data; at least one processor that is coupled to the memory by a system bus, the display, and the user input device; and said processor executing the machine instructions to carry out a plurality of functions.

In the preferred embodiment of this system, the processor accepts user input or automatically executes the machine instructions to carry out the plurality of functions, including the methods described herein.

Those skilled in the art will appreciate that this invention might also be practiced with other computer system configurations, such as a client device for executing personal productivity tools, including hand-held devices, pocket personal computing devices, other microprocessor-based or programmable consumer electronic devices, multiprocessor systems, network PCs, minicomputers, mainframe computers, and the like. Furthermore, the present invention can also be practiced in distributed computing environments, where tasks are performed by remote processing devices that are linked through a communications network. In a distributed computing environment, machine instructions may be located in both local and remote memory storage devices.

Figure 4:
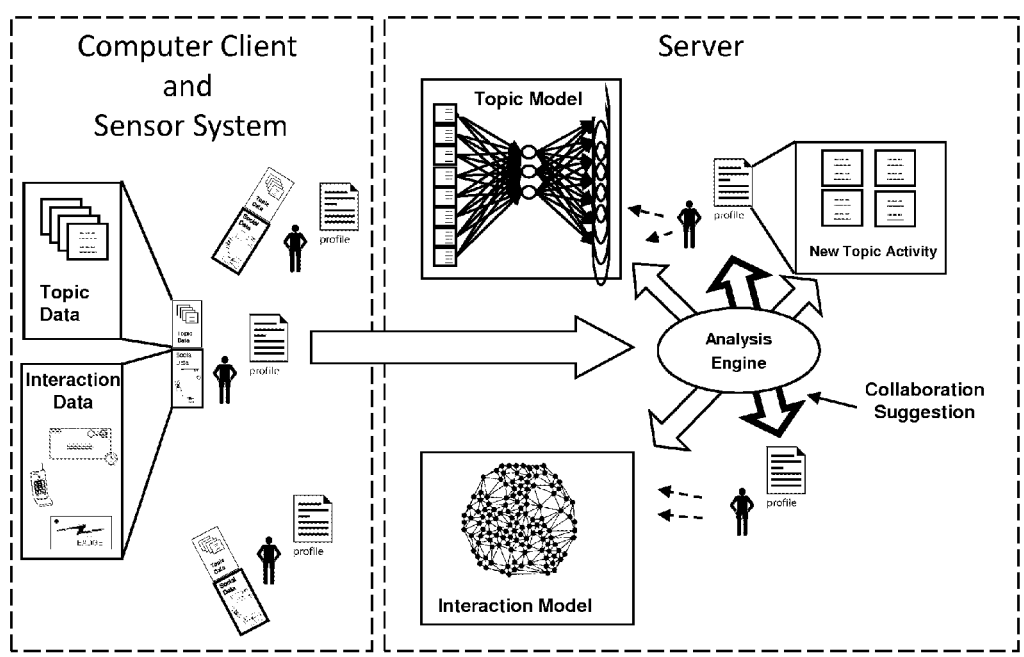
FIG. 4 illustrates a functional diagram of one embodiment of the entity profiling system.

FIG. 4 shows one embodiment of the entity profiling system architecture. The entity profiling system is able to cultivate entity profiles by incorporating topic and interaction information from a variety of data sources to build an integrated model of the whole organization from these profiles. One embodiment of the entity profiling system has three main components: a computer client, which is a client application that manages entity settings and communicates entity characteristics; a server having logic responsible for storing, sharing and analyzing the data collected to identify similarities and new collaboration opportunities; and a sensor system for collecting interaction information. Embodiments of the profiling system also include a reporting interface, such as a web browser and server or an email client and email server which allows the user to receive collaboration suggestion.

Figure 5:
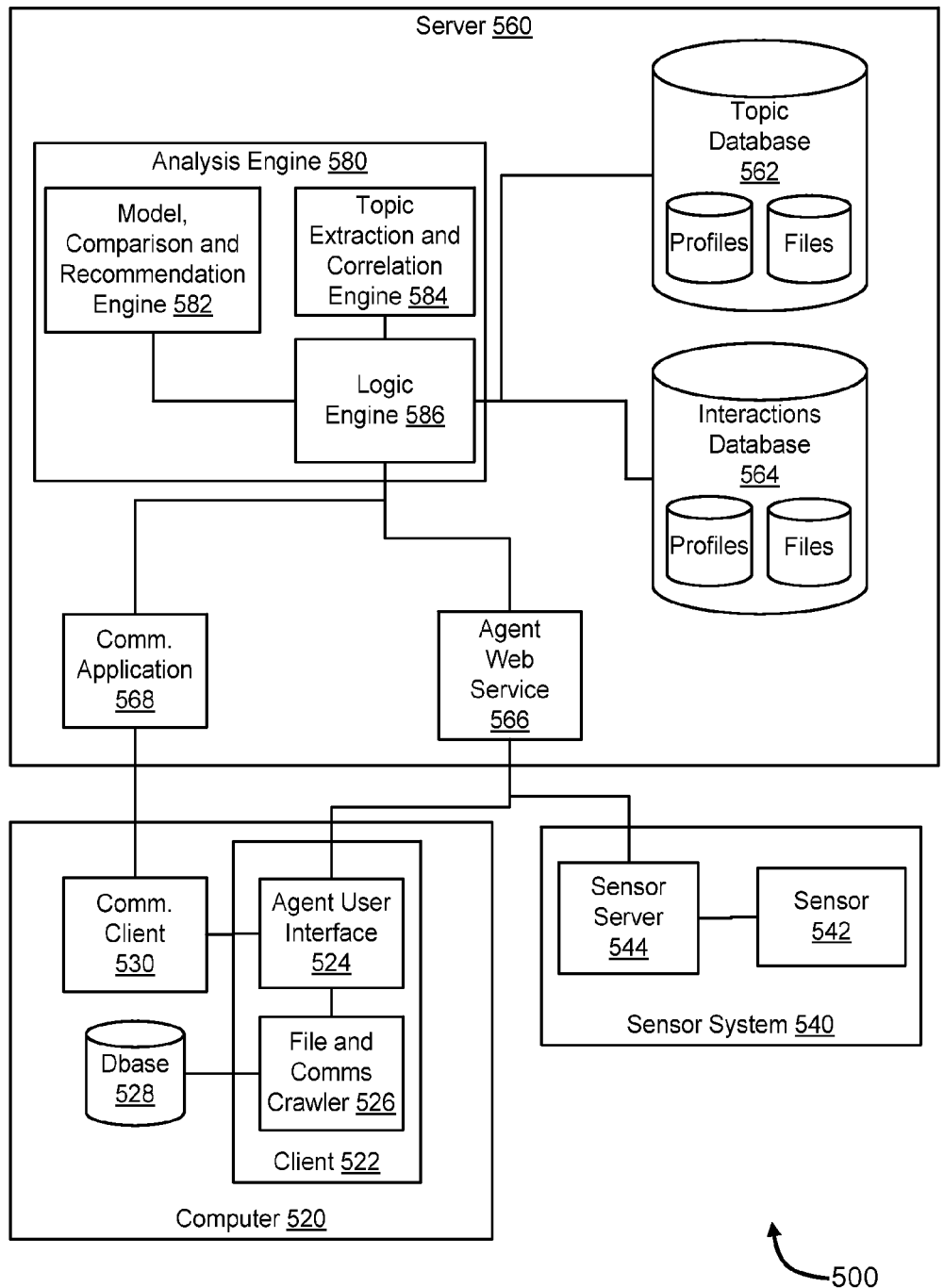
FIG. 5 shows one embodiment of the interaction sensor.

FIG. 5 illustrates a functional diagram of the component architecture of one embodiment of a computer based entity profiling system. As shown, the system comprises three major components, a computer client 520, a server 560 and a sensor system 540.

Computer Components:

Referring to FIG. 5, the computer client 520, which is a client application that functions to manage data collection settings, manage system content that has been collected and remove any unwanted items and notifications. The client component is installed locally on each user's network-enabled computer 520, or any similar processor based communications device. The client has an agent user interface 524 that allows the user to configure the agent, a file and communications crawler 526 that collects and sends data specified in the configuration to the respective server and a communication application, such as a web browser or an email client for reviewing user data, recommendations, and providing feedback.

The agent user interface 524 allows the user to specify the different sources that can be crawled and sent to the server. One embodiment of the file and communications crawler is able to collect and send local files (.pdf, .doc, .ppt, .txt, .html, etc.), local Thunderbird mail, and IMAP mail that is stored on the computer database 528. It is understood that other embodiments of the system can similarly be capable of collecting chat communications and Outlook mail.

Figure 7:
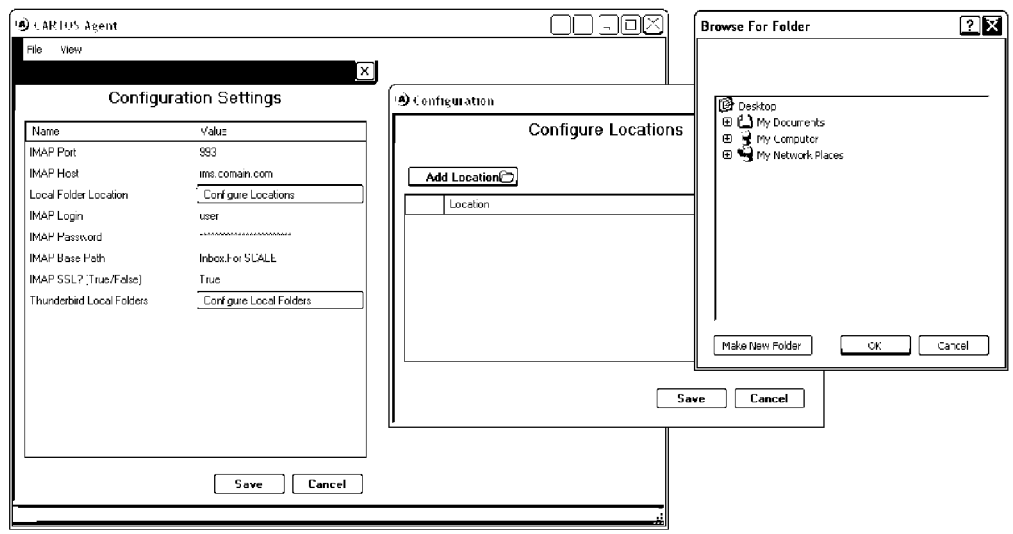
FIG. 7 illustrates one embodiment of a screen shot of the desktop agent.

Under the computer client configuration settings, users can configure the file and communications crawler 526 to include email IMAP access, add local file locations, and select local email folders. FIG. 7 illustrates one embodiment of a screen shot of the desktop agent user interface.

User content stored locally on the computer database 528 is converted to text by the file and communications crawler 526, and sent to the server 560 components for analysis and storage. As the user adds new content is into the specified crawling locations, incremental updates are sent to the server. For extracting text, the crawler utilizes common tools for crawling and extracting information from digital files. One suitable tool includes the software tool Aperture which can be found at (http://aperture.sourceforge.net/). Aperture is an open source Java framework for crawling and extracting text and metadata from the majority of common digital file formats such as, but not limited to plain text, HTML, XML, PDF, RTF and Microsoft Office applications.

A web browser is an example of one type of communication client 530 used on the client side to access the web communication application component 568 of the server 560. This access allows users to view the data collected, the different networks derived from them, as well as the suggested collaborations from the server.

Although clients and agents on computers are described above, other platforms allow the collection of representations of an individual's knowledge/work/interests are contemplated. These other platforms include, but are not limited to, portable computers, cell phones, desktop phones, personal messaging devices or other personal communications devices.

Server Components:

Referring again to FIG. 5, the entity profiling system server 560 manages the collection and analysis of the entity data as well as the determination and communication of recommendations from the system. The server 560 also constructs models and profiles using text analysis techniques and social network techniques. The server components include an agent web service 566, an analysis engine 580, an interactions database 564, a topic database 562, and a communications application 568. The analysis engine 580 further comprises a logic engine 586, a topic extraction and correlation engine 584 and a model, comparison and recommendation engine 582. The server components provide the services needed for collecting and storing the required data, analyzing text and social networks, constructing recommendations for collaboration, and for handling all the interactions with other services.

The agent web service 566 provides an interface for the computer client 522 and the sensor system 540 to submit data that has been collected to the topic and interaction databases. As new sensor data is offloaded to the sensor server 544, the agent web service 566 queries the server 544 collecting summaries of the new data that are then stored in the interaction database 564. This service also eliminates duplicate documents and messages collected from the crawled content via the client 522 using the logic engine 586 to store only new data in the respective database.

The logic engine 586 manages all the information transferred from the agent web service 566 or communication application 568, the topic and interactions database (562 and 564 respectively), the topic extraction and correlation engine and the model, comparison and recommendation engine (584, 586 and 582 respectively). The logic engine 586 also controls other communications through the server's communication application 568.

The topic extraction and correlation engine 584 (also called LAVA) analyzes communications and files to extract metadata, topics, and taxonomy values, and sends them to the logic engine 586 to be stored in the topic database 562 (steps 112 and 114 of FIG. 1). LAVA is a linguistic analysis platform that provides a framework for the development of statistical language models, as well as a number of attendant pre & post processing features. LAVA includes a Java PLSA implementation that utilizes Intel's Math Kernel Library (MKL).

LAVA provides a generalizable platform for developing, extending, and interpreting statistically-based latent variable models of language. Typical models include, but are not limited to pLSA, the Correlated Topic Model (CTM) and Dirichlet Multinomial Regression (DMR). In this embodiment, the domain knowledge is alternatively, or additionally, modeled with metadata associated with the documents. This metadata can be applied manually (e.g., the Document properties of a Microsoft Word document can be edited by hand), automatically (the login name is attached by the operating system as owner of every document created by a user), or using another method of creating metadata for documents. For the latter, a supervised machine learning technique, such as a Support Vector Machine (SVM) or any others known in the art, is trained on documents that the editors of Wikipedia, or other open-source set of documents (e.g., Wikipedia or the websites linked at the Open Directory Project at www.dmoz.org), have placed into a set of categories, which may also be structured hierarchically. The SVM is first trained on the words and other features of the documents in the category. Every document in the organization is then given a score as to its relevance, if above threshold, to every category. This category information is then added to, or substituted for, the topic model information in order to create a topic profile for the entity.

The modeling and recommendation engine is responsible for building the organizational models, which are then used to identify opportunities for collaboration. Through the logic engine, the topic database is queried to develop the person to topic model and temporal work flow models (step 116 of FIG. 1). These models are then used to create person to person topic models that can be used for the recommendation stage. The interaction data is also analyzed to develop interaction models for person to person relationships. Different interaction models, such as email, face-to-face, and proximity are then compared to the person to person topic models to identify recommendations. These recommendations are also further prioritized, ordered, or weighted by additional social network measures calculated within the component. The server communication application 568 can generally be any type of application that can communicate with a computer based client. In this embodiment, the interface is envisioned to be a web-based application, such as a server, that is able to access and share the information associated with each collaboration suggestion. With their communications client 530, the user can then "drill down," using hyperlinks within each suggestion to view the criteria that was factored into the collaboration engine's decision. If information is contained within the suggestion that is deemed irrelevant, it can be dismissed in order to improve future suggestions. This application can also be used to initiate the release of entities for collaborating. This process will ensure that both users accept the invitation after reviewing the subject, and prior to any identity information being released. The reporting interface may also be used to collect data on the collaboration engine's performance.

Sensor System Components:

The sensor system 540 components comprise a sensor 542 and a sensor server 544. The sensor 542 is a portable device that tracks, records and communicates interaction data such as location, conversations, proximity to other sensors and other environmental data. The sensor 542 communicates this data to the computer based sensor server 544 that analyzes, formats and communicates the data to the entity profiling system server 560. As mentioned herein, the operation, use and integration of one suitable sensor system with a computing environment is disclosed in U.S. Pat. No. 6,757,719 to Lightman and U.S. Patent Pub. No. US2005/0021679 to Lightman.

Figure 6:
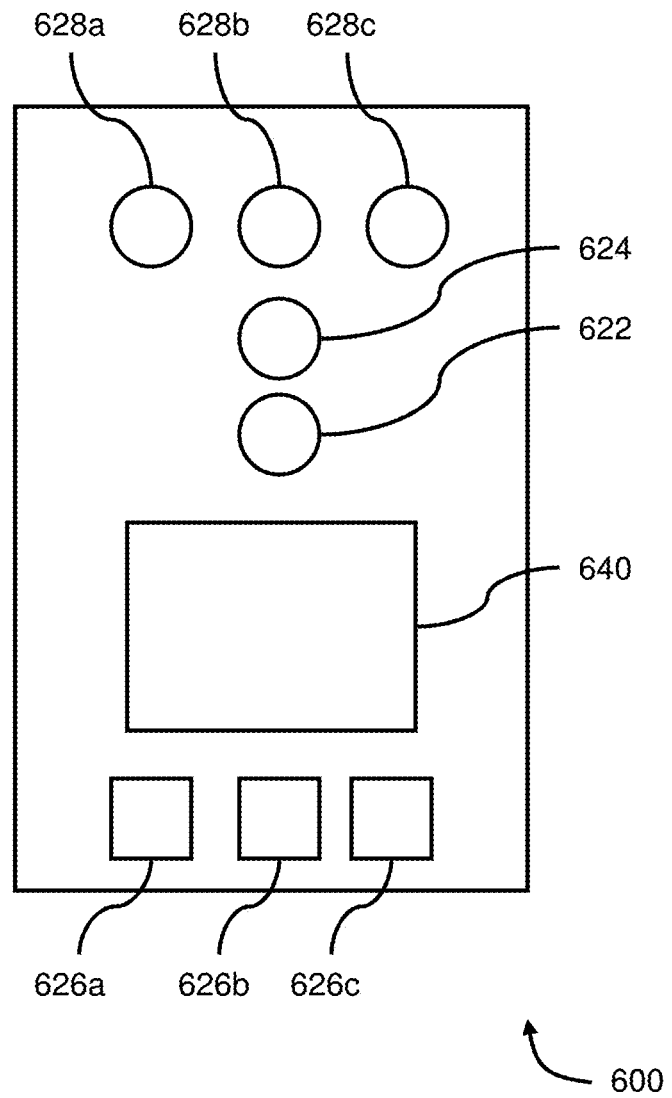
FIG. 6 illustrates a functional diagram of one embodiment of the entity profiling system.

As shown in FIG. 6, one embodiment of the sensor 600 comprises a badge having an audible device 622, a microphone 624, a camera, a display 640 a plurality of indicators 626a, 626b, 626c and a plurality of activation buttons 628a, 628b, 628c. The sensor 600 may comprise a specially programmed computer having a memory, a central processing unit in communication with a system bus, machine instructions to manage all parts of the sensor and communication elements to exchange information from the sensor. Communication elements may comprise wired or wireless receivers and transmitters for communication with the sensor server.

Other Applications and Embodiments:

The present invention is illustrated by, but by no means limited to, the above description of one embodiment. In particular, the system and method were described as an embodiment of comparing a set of knowledge/work/interests representing individual members of a group of people to a model representing a social network of that group of people to show opportunities for collaboration. It is understood that other embodiments of the invention can be applied to many other data entity types and many other sources of data. In addition to discovering opportunities for collaboration, other embodiments of the invention may also be used facilitate information sharing, provide targeted advertising, discover new resources for groups and individuals, and aid other social knowledge discovery activities.

With the use of topic modeling tools, such as Probabilistic Latent Semantic Analysis, to capture the changing interests and work of an individual and modeling social network representations taken from tools such as e-mail, text messages, cell phones, web-surfing patterns or face-to-face communication that correspond to actual interaction within the organization, many different applications are possible. It is understood that embodiments of the novel methods disclosed can be used for applications that include, but are not limited to: identifying opportunities for more efficient information sharing for an individual in a group based on their knowledge model as pulled from their desktop and compared to the knowledge model and social network model of other members of that group; identifying collaboration opportunities for an individual in a group based on their knowledge model as pulled from their desktop and compared to the knowledge model and social network model of other members of that group; identifying sales opportunities for a retail organization based on the knowledge model of an ideal purchaser and comparing that to the knowledge model and social network model of a group of individuals; identifying target individuals surfing the web based on the knowledge model of an ideal target and comparing that model to the knowledge model and social network model pulled from web browser logs; and identifying opportunities for targeting individuals using network resources based on the knowledge model of an ideal target and compare that model to the knowledge model and social network model pulled from their network traffic and network traffic pattern.

Pilot Implementation:

In order to demonstrate the feasibility and effectiveness of the described systems and methods to spawning organizational collaboration, a small pilot study was conducted. To evaluate the feasibility of this approach, each of the components of the system—the e-mail network extractor of the computer client, the document/similarity matcher of the computer client, and the informal network extractor of the Sociometric Badge—was piloted and the results analyzed. This is a critical step before integration of the individual technologies to ensure that recommendations for interaction are based upon true need rather than technological artifacts. The pilot study was conducted during a period of work when individual leaders interact with multiple teams in addition to their day-to-day project activities. By concentrating on a period of high activity, we overcame one of the limitations of a short-term evaluation.

The pilot study was conducted by soliciting twenty volunteers for a week-long evaluation period. During this phase, the volunteers selected only included those that had the potential to provide technical contributions, thus excluding administrative and support staff. Each participant installed the computer client, which he or she then configured to upload document data indicative of one's work area as well as email data. Each individual also received a Sociometric Badge that they were instructed to wear during normal work activity. The data collected throughout the week was then used to test the different analysis techniques for discovering collaboration opportunities that were developed in the first three tasks. The results of the pilot study and analysis are discussed in the following section.

Results indicated that it was technically feasible to use a distributed desktop system in concert with a wearable sensor to collect enough information about an organization to create an accurate representation of its knowledge areas and social organization. In addition we were able to generate some interesting analyses of the data that illustrate how a number of opportunities for collaboration might be discovered.

Figure 8:
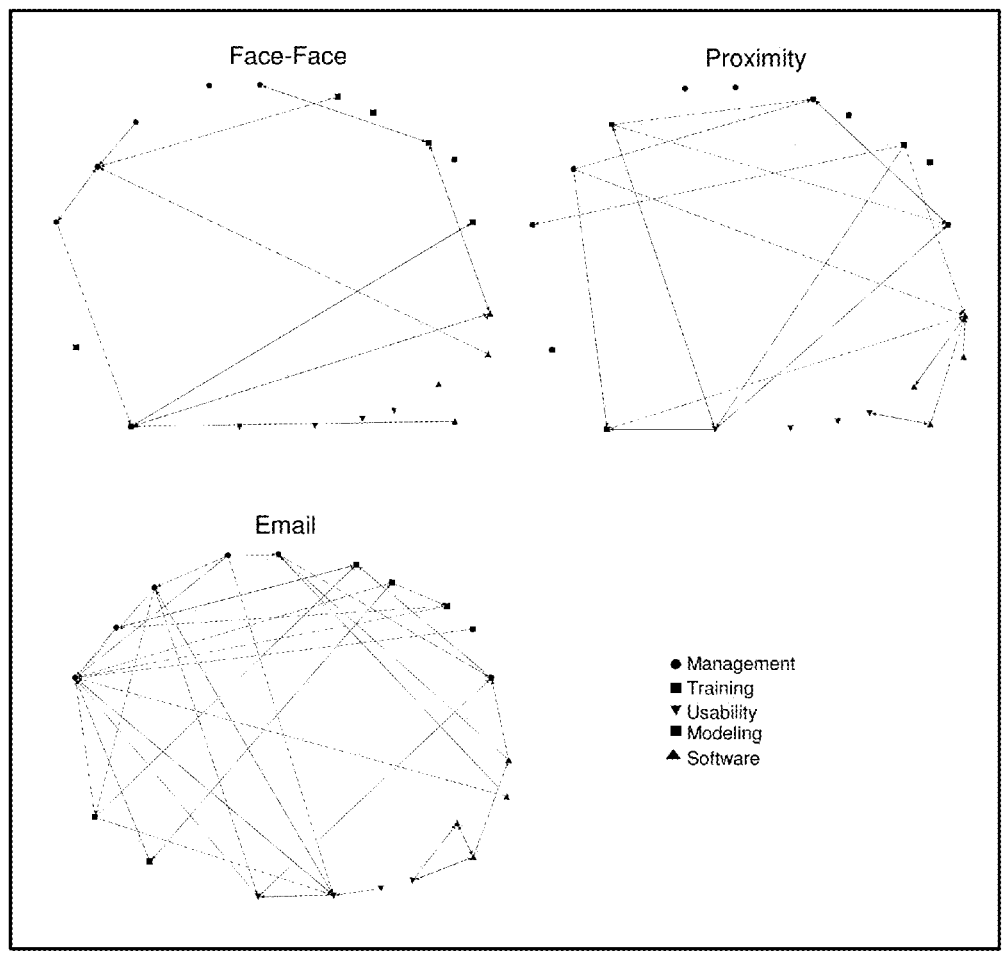
FIG. 8 illustrates a graphical illustration of one embodiment of the interactions of entities.

During this pilot, a social network was constructed based on direct person-to-person email communication between the set of 20 individuals. These individuals were spread across—but did not wholly constitute—several functional and project areas at the pilot site. The social network represents the relationship "receipt of email from." That is, a directed tie exists from person (a) to person (b) when person (a) received email from person (b). The strength of a connection was represented as the percentage of the email received by the other participants in relation to the total number of emails received. A similar graph was created using the wearable sensors. In these cases the graphs were undirected since the badges were simply detecting proximity (via Bluetooth) and face-to-face occurrences (via the lining up of IR sensors). FIG. 8 shows how different the social networks formed can be.

Figure 9:
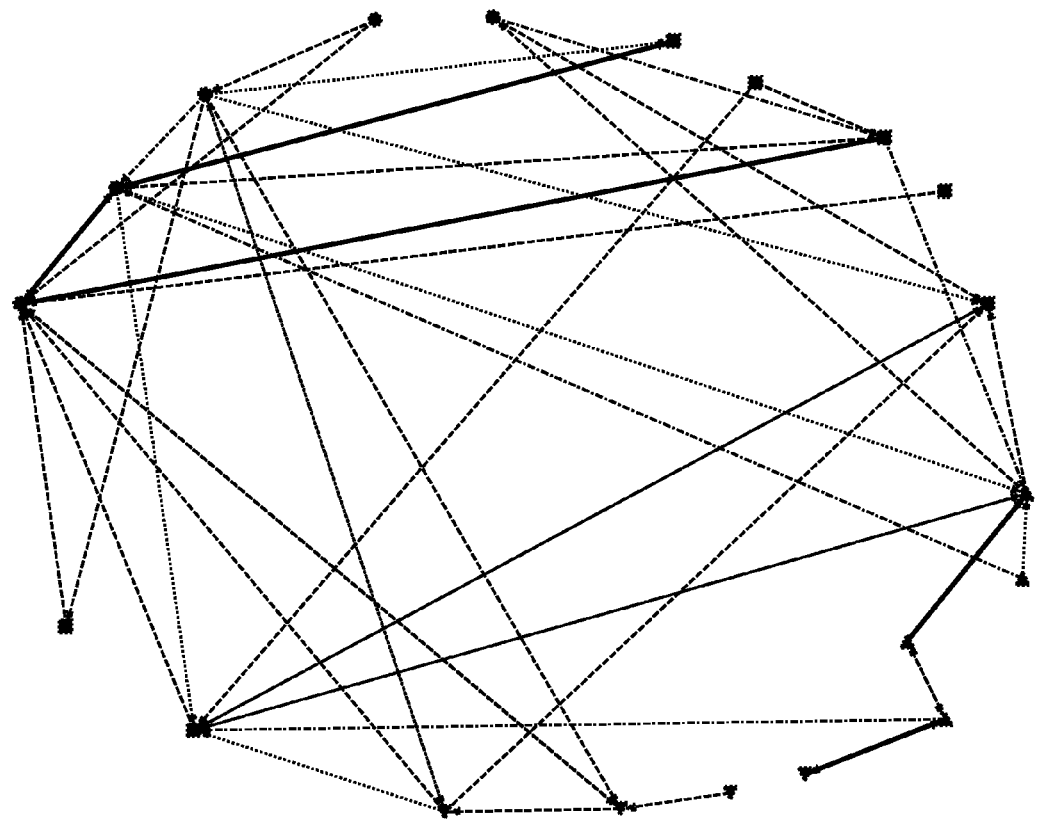
FIG. 9 illustrates a graphical illustration of interactions of entities.

The total information sharing, shown in FIG. 9 further illustrates the differences as well as some other interesting patterns. In this graph at least 15% of a person's communication through a given medium was required for a link to be drawn. The solid, thick, bars are multiplex relationships (all mediums were significantly recorded), dashed lines represent email, dash dotted lines are IR (face-to-face), and dotted lines show proximity links. In addition, managers are depicted as circles, usability specialist are shown as inverted triangles, programmers as triangles, training and organizational physiologists and modeling and simulation specialists are depicted rectangles.

From FIG. 9 it is clear that several individuals are not well connected to the other individuals in the study. While there are indeed several cross-functional collaborations, there may be additional opportunities between individuals.

To identify influential people, we generated a network measure representing the percentage of each actor's received emails that originated from each of the other members of the pilot. (To facilitate data collection and analyses in the pilot, we limit data to only email messages in which both recipient and sender were participating in the pilot.

While this clearly will overstate the magnitude of any concentration of influence compared to all communication actually directed at the actors, for those actors within the pilot, the relative ranking of concentration from the actors would remain constant.) This line of reasoning uses communication frequency as a proxy for the potential of one actor to influence another. These networks can be viewed as a matrix of the percentages of messages from person to person, such as the data from this experiment shown in FIG. 10. Because these are directed data, and were normalized by row (i.e., each cell in a row represents the percent of messages originating from the actor in that column), the row sums, or out-degree centrality, are all 1.00.

Down the columns, however, the numbers represent the percentage of the other individual's email which the actor in that column generates. Thus, the sum of the column sums can be thought of as the proportion of "mind share" (at least as represented by the proxy of email communication) the actor in the column enjoys in the network, and is represented by in-degree centrality. In this experiment, the person represented by ID 108 has a high in-degree centrality, which is appropriate considering that he is in a managerial role.

Figure 11:
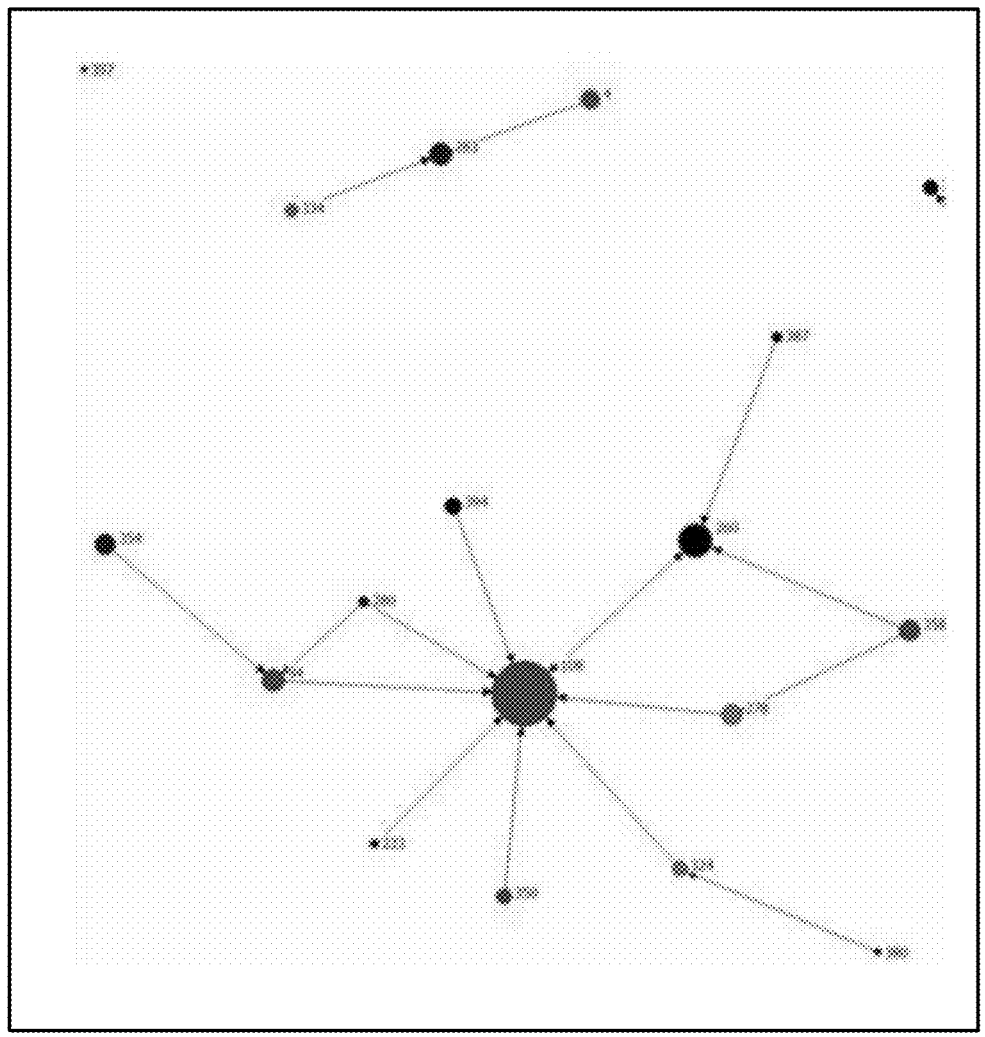
FIG. 11 illustrates one graphical illustration of influence potential in a social network.

FIG. 11 depicts the "influence potential" network. An arrow is only present from person (a) to person (b) if person (b) generated at least 25% of the emails person (a) received during the pilot study. This criterion was chosen because it highlighted the strongest ties by providing the smallest number of edges while ensuring that the majority of the individuals were represented in the structure. Person nodes are sized according to out-degree centrality, which is roughly the sum of the percentage of other people's mail each person is responsible for. Person nodes are colored based on the functions of the person (manager, training, etc.). The graph makes it quite clear that person 108 is responsible for the highest proportion of other people's email traffic. Specifically, person 108 generates at least 25% of the email for the eight individuals who have ties to it. In performing this analysis on the data collected in the pilot, despite the limitations created through data and sampling constraints, we were able to identify several groups which had face validity within the organization (e.g., a cluster representing "senior management," a dyad representing two software engineers who work closely). While there were two groupings that were less intuitive, the exercise of using structural equivalence for redundancy, exhaustiveness, and replacement functions in building teams seems promising. With a more complete survey of communication networks, a more comprehensive examination of the applications and potential benefits of this line of analysis can be completed. The social network analysis provides the entity profiling system with an understanding of how the organization is currently wired together. The next step towards identifying opportunities is to use the collaboration engine to compare recent work against the global topic model. In the pilot study, three of the most recent documents uploaded by each participant were in turn submitted against the pLSA model. The top ten documents in the return were then linked to the original owner ID and summed across all three result sets. The outcome was a directed matrix similar to the email communication data. Since some of the documents had no returns, we again normalized the data by row to measure in-degree and out degree centrality. FIG. 12, table 3 shows the results of this analysis. There are some interesting measurements worth noting on their own. The participant 354 and 278 have a high out-degree centrality, which might mean that these people are knowledge hubs for a significant portion of the most recent work.

Now that all the data has been collected and processed, the final stage of the entity profiling methods can be completed. To do this, we simply compared the total communication average against the strength of knowledge similarity returned by the topic model for each participant's recent work. By subtracting the total communication matrix (average of email, proximity, and face-to-face) from the knowledge matrix, we arrived at a measure of the directed interest potential between each of the subjects. This measurement provides a value between −1 and 1, where −1 can be interpreted as an excess in communication in regards to current interests, 0 as reasonable balance, and 1 as total lack in communication in regards to highly similar interests. Table 4 of FIG. 12 provides a summary of these measures with excess to reasonable balance in green, slight disconnects in yellow, and stronger disconnects in red. As to be somewhat expected, the knowledge hubs, have a number of interest potentials from other participants, but there are other cases where opportunities may be present. In taking the maximum scores: participants 359 and 223 may want to meet with 278, 94 might benefit from 283, 322 from 354, and 260 and 350 may want to meeting with 94 about their current work activities.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention. Although this invention has been described in the above forms with a certain degree of particularity, it is understood that the present disclosure has been made only by way of example and numerous changes in the details of construction and combination and arrangement of parts may be resorted to without departing from the spirit and scope of the invention.

We claim:

1. A computer-based method of profiling entity information, said method comprising the steps of:
   automatically determining an interaction model of a set of interaction information from a group of entities;
   the interaction model comprises a representation of interactions between a first entity from the group of entities and a second entity from the group of entities;
   the first entity is a first individual and the second entity is a second individual;
   automatically determining a topic model for at least the first entity and the second entity;
   determining a first entity topic profile for the first entity and a second entity topic profile for the second entity;
   comparing the first entity topic profile and the second entity topic profile to identify a degree of topic similarity of the first entity and the second entity;
   determining a first entity interaction profile for the first entity and a second entity interaction profile for the second entity from the interaction model;

comparing the first entity interaction profile and the second entity interaction profile to identify a degree of interaction similarity of the first entity and the second entity; and comparing the degree of topic similarity of the first entity and the second entity and the degree of interaction similarity of the first entity and the second entity whereby a change in one of the first entity topic profile or the second entity topic profile can be identified to influence the degree of topic similarity of the first entity and the second entity.

2. The computer-based method of profiling entity information of claim 1 wherein the interaction information comprises communication information sent from the first entity from the group of entities to the second entity from the group of entities.

3. The computer-based method of profiling entity information of claim 2 wherein the interaction information further comprises communication information sent from the second entity from the group of entities to the first entity from the group of entities.

4. The computer-based method of profiling entity information of claim 1 wherein the interaction information comprises simultaneous location information of the first entity from the group of entities relative to location information of the second entity from the group of entities.

5. The computer-based method of profiling entity information of claim 4 wherein the location information comprises simultaneous proximity information representing a physical location of the first entity relative to a physical location of the second entity from an interaction sensor.

6. The computer-based method of profiling entity information of claim 1 wherein:
the step of determining the interaction model comprises using semantic analysis techniques on the interaction information of the first entity of the group of entities; and
the interaction information of the first entity is resident on a computing device of the first entity.

7. The computer-based method of profiling entity information of claim 1 wherein the interaction information comprises communication information sent from the first entity to a specific second entity utilizing at least two of the interaction types selected from the group consisting of: email messaging, text messaging and phone call.

8. The computer-based method of profiling entity information of claim 1 wherein:
the interaction model defines a link between the first entity from the group of entities to the second entity from the group of entities; and
the link represents the set of interactions between the first entity and the second entity.

9. The computer-based method of profiling entity information of claim 1 wherein:
automatically determining a topic model for at least the first entity and the second entity comprises automatically determining a topic model for at least the first entity and the second entity from the set of interaction information from a group of entities.

10. The computer-based method of profiling entity information of claim 1 further comprising:
determining an entity topic comparison function to identify the degree of topic similarity of the at least two entities; and whereby a change in one of the first entity interaction profile or the second entity interaction profile can be identified to influence the degree of topic similarity of the first entity and the second entity.

11. The computer-based method of profiling entity information of claim 1 wherein the step of comparing the degree of topic similarity of the first entity and the second entity and the degree of interaction similarity of the first entity and the second entity comprises creating a topic matrix and an interaction matrix and subtracting the matrices to create at least one similarity matrix.

12. The computer-based method of profiling entity information of claim 1 wherein the change in the interaction profile to influence the degree of topic similarity of the first entity and the second entity is communicated to one of the first entity or the second entity.

13. The computer-based method of profiling entity information of claim 1 wherein:
the interaction information comprises interaction information of a first entity and a second entity; and
the interaction model comprises a statistical social network model of the first entity and the second entity.

14. The computer-based method of profiling entity information of claim 1 wherein:
the interaction information comprises interaction information between a first entity from the group of entities and a second entity from the group of entities; and
the interaction model links the first entity and the second entity.

15. The computer-based method of profiling entity information of claim 1 wherein the interaction information comprises a first interaction information type and a second interaction information type.

16. The computer-based method of profiling entity information of claim 1 wherein:
the interaction information comprises location information of the first entity from the group of entities relative to location information of the second entity from the group of entities; and
the location information of the first entity is provided by a first interaction sensor and the location information of the second entity is provided by a second interaction sensor.

17. The computer-based method of profiling entity information of claim 1 wherein the interaction information comprises simultaneous proximity information representing a physical location of the first entity relative to a physical location of the second entity from an interaction sensor.

18. The computer-based method of profiling entity information of claim 17 wherein the location information comprises simultaneous proximity information representing a physical location of the first entity relative to a physical location of the second entity from an interaction sensor.

19. The computer-based method of profiling entity information of claim 17 wherein the location information of the first entity is provided by a first interaction sensor and the location information of the second entity is provided by a second interaction sensor.

20. The computer-based method of profiling entity information of claim 17 wherein the interaction information further comprises communication information sent from the first entity from the group of entities to the second entity from the group of entities.

* * * * *